Figure 1:
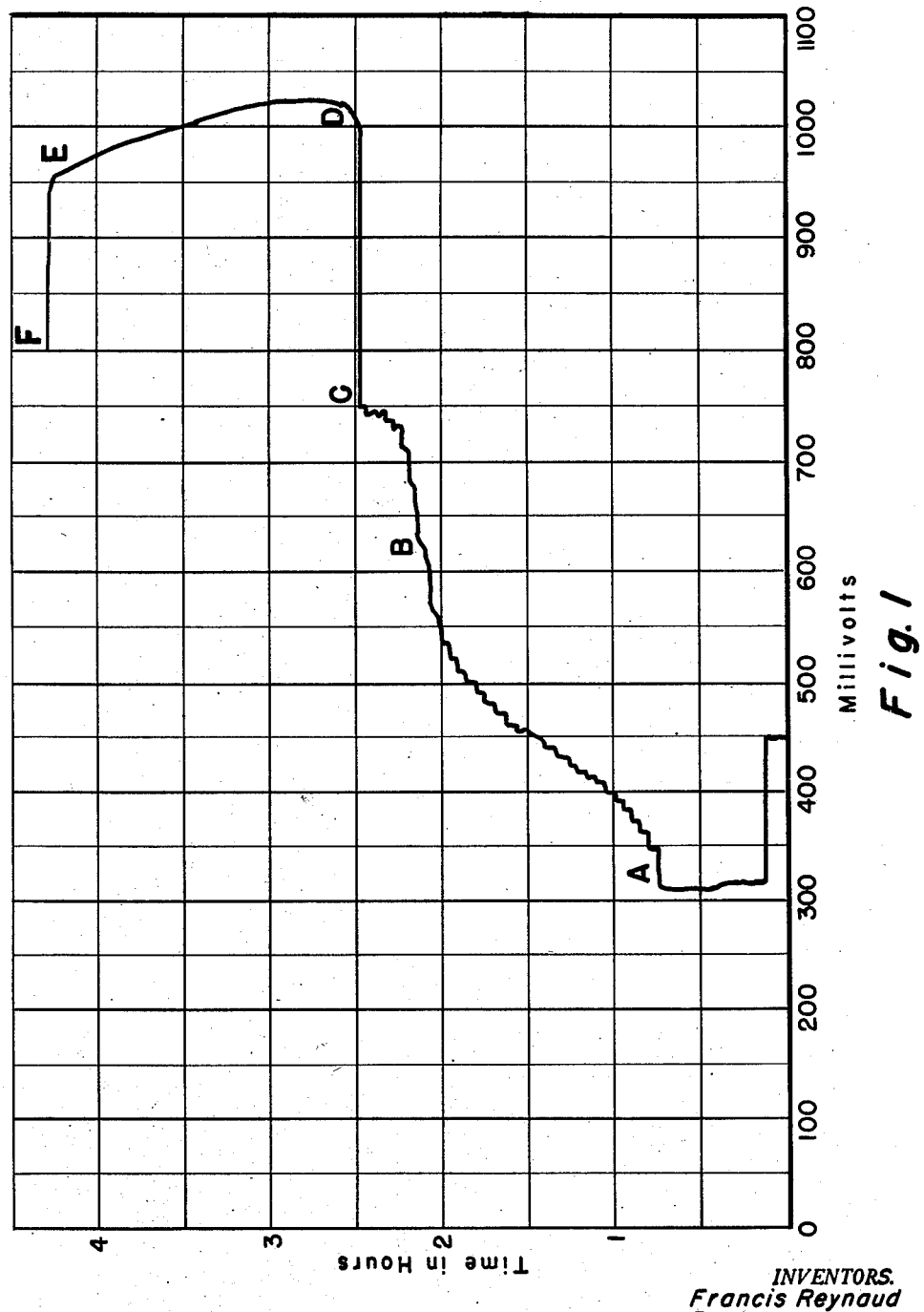

May 20, 1958 F. REYNAUD ET AL 2,835,569
PROCESS OF EXTRACTING GOLD AND OTHER METALS
FROM ORES, CONCENTRATES, RESIDUES AND
THE LIKE CONTAINING PRINCIPALLY
COBALT, NICKEL, IRON, ARSENIC
AND GOLD

Filed April 19, 1956 3 Sheets-Sheet 1

INVENTORS.
Francis Reynaud
Paul Claraz
BY Webb, Mackey & Burden

THEIR ATTORNEYS

May 20, 1958

F. REYNAUD ET AL 2,835,569

PROCESS OF EXTRACTING GOLD AND OTHER METALS
FROM ORES, CONCENTRATES, RESIDUES AND
THE LIKE CONTAINING PRINCIPALLY
COBALT, NICKEL, IRON, ARSENIC
AND GOLD

Filed April 19, 1956

3 Sheets-Sheet 2

INVENTORS.
Francis Reynaud
Paul Claraz
BY Webb, Mackey & Burden

THEIR ATTORNEYS

United States Patent Office 2,835,569
Patented May 20, 1958

2,835,569

PROCESS OF EXTRACTING GOLD AND OTHER METALS FROM ORES, CONCENTRATES, RESIDUES AND THE LIKE CONTAINING PRINCIPALLY COBALT, NICKEL, IRON, ARSENIC AND GOLD

Francis Reynaud and Paul Claraz, Pombliere, France, assignors to Societe d'Electro-Chimie d'Electro-Metallurgie et des Acieries Electriques d'Ugine, Paris, France, a corporation of France Application April 19, 1956, Serial No. 579,173

17 Claims. (Cl. 75—118)

This invention relates to a process of extracting gold and other metals from ores, concentrates, residues and the like containing principally cobalt, nickel, iron, arsenic and gold.

Some ores, concentrates, residues and the like (in all of the following, only the term "ore" will be employed to designate these materials), particularly arsenide or sulpharsenide ores of cobalt and/or nickel, generally contain gold in metallic form. The process generally used heretofore in order to separate gold from such ores consists in concentrating the gold in a residue resulting from acid attack on the ore. This concentration is generally obtained by producing, at the end of the acid attack, a separation of the residue in a very acidic medium. The concentrate is then treated according to the usual methods of extracting gold such, for example, as cyanidation or smelting. The applicants, however, have found it possible to carry out the solubilizing of gold and its extraction from the ore without first separating a residue containing gold from the ore and thereafter separating the gold from the residue.

According to the present invention for extracting gold and other metals from ores containing principally cobalt and/or nickel, iron, arsenic and gold, a mineral acid is added to the finely ground ore to form a slurry. An agent capable of developing chlorine which acts as an oxidizing agent is added to the slurry at a given rate to cause a gradual rise in the oxidation potential of the slurry (in all of the following, only the term "oxidizing agent" will be employed to designate this agent). The oxidation potential of the slurry is continuously measured during the addition of the oxidizing agent as, for example, by the use of a chain of platinum-saturated calomel electrodes. When all of the metals except gold and silver, if any, have been oxidized, the addition of the oxidizing agent is continued to create an oxidation potential sufficiently high to dissolve the gold and silver. Normally there is a sudden and rapid rise in the oxidation potential of the slurry up to a value sufficient to achieve this dissolution. The rate of addition of the oxidizing agent is then limited to the rate required for maintaining the slurry at an oxidation potential sufficient to dissolve gold until nearly all of the gold has been dissolved. Thereafter, the acidity of the slurry is lowered to precipitate iron and arsenic as ferric arsenate and the precipitate, together with insoluble residue, is separated from the solution. This solution is then substantially free of iron and arsenic but contains particularly cobalt, nickel and gold. The gold is then recovered from the solution.

It is also possible according to the present invention to extract gold and other metals from ores containing principally cobalt and/or nickel, iron, arsenic and gold by placing the finely ground ore in a sulphonitric medium to form a slurry. An agent such as NaCl or HCl, which in this sulphonitric medium has oxidizing properties, is added to the slurry to cause a slow rise in the oxidation potential of the slurry. The oxidation potential of the slurry is continuously measured during the dissolution of the ore as, for example, by the use of a chain of platinum-saturated calomel electrodes. The oxidation potential rises slowly to about 800 millivolts at which point a dissolution of substantially all the gold has been obtained without a complete conversion of the arsenious acid into arsenic acid in the slurry. Thereafter, the acidity of the slurry is lowered to precipitate iron and arsenic as ferric arsenate and the pricipitate, together with the insoluble residue, is separated from the solution. The solution is then substantially free of iron and arsenic but contains cobalt, nickel and gold. The gold is then recovered from the solution.

Figure 2:
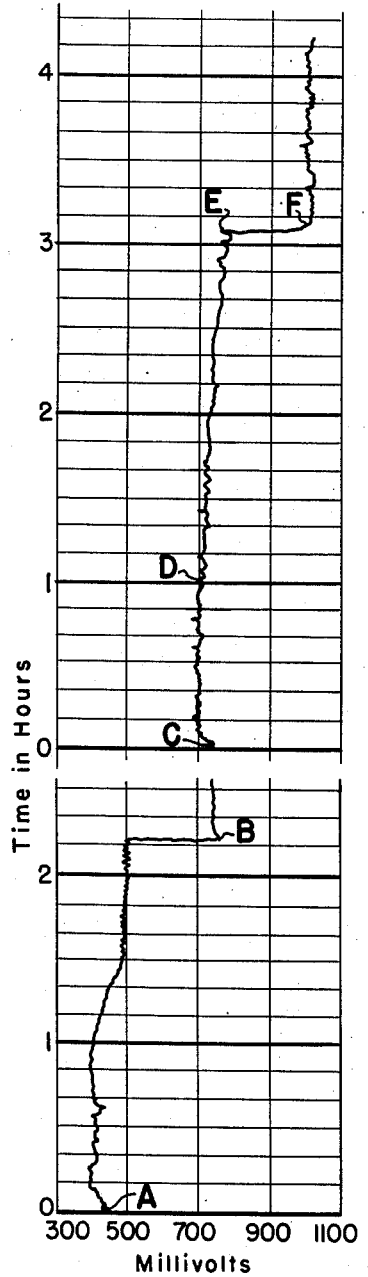
Figure 3:
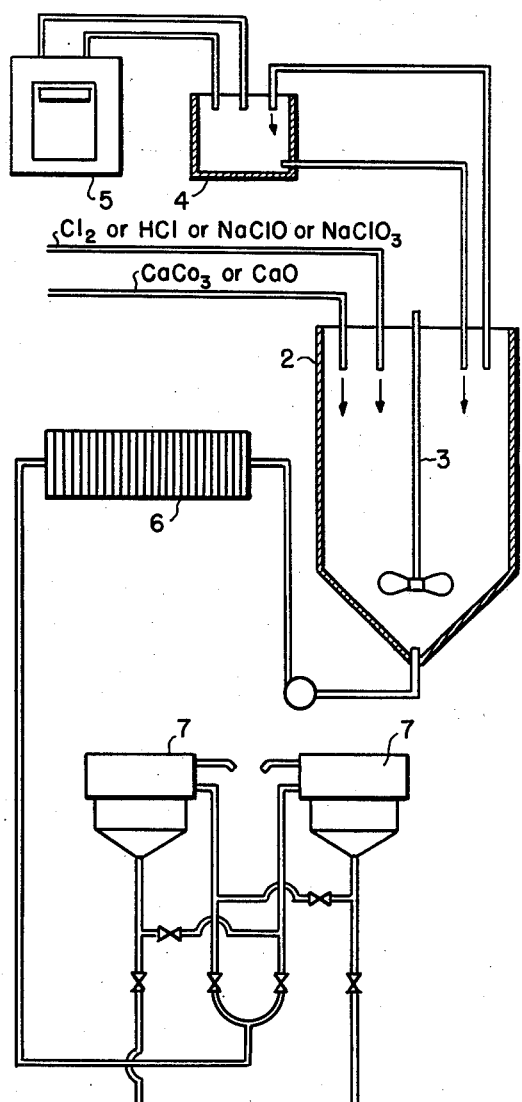
Figure 4:
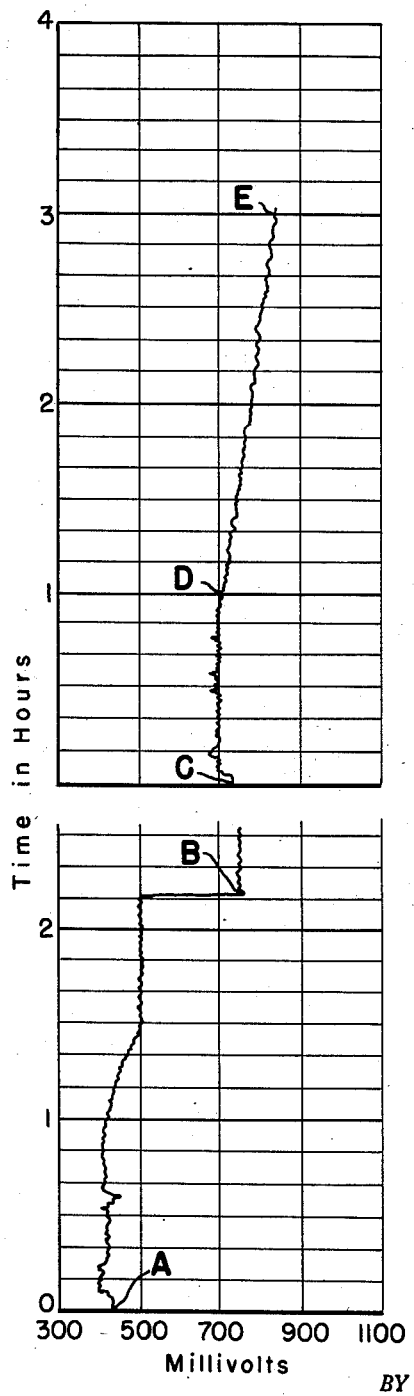

In the accompanying drawings which illustrate a preferred embodiment of our invention, Figure 1 is a typical curve representing the oxidation potentials of the ore slurry during the course of treatment of an ore according to the present invention, the abscissas designating millivolts and the ordinates designating time in hours;

Figure 2 is a typical curve representing the oxidation potentials of the ore slurry, when the acidic medium is sulphonitric and the oxidizing agent is chlorine, a hypochlorite or a chlorate, during the course of treatment of an ore according to the present invention, the abscissas designating millivolts and the ordinates designating time in hours;

Figure 3 is a diagrammatic illustration of an apparatus suitable for carrying out the process; and Figure 4 is a typical curve representing the oxidation potentials of the ore slurry, when the acidic medium is sulphonitric and the oxidizing agent is NaCl, during the course of treatment of an ore according to the present invention, the abscissas designating millivolts and the ordinates designating time in hours.

The present process is essentially characterized by the fact that the reactions are controlled by continuously measuring the oxidation potentials of the slurry of ore and acid which enables one to follow the progress of the oxidation, first of the metals or compounds other than gold, then of gold itself. The measurement of the oxidation potential of the slurry may be obtained, for example, by means of a chain of platinum-saturated calomel electrodes. The dissolving of gold is possible due to the presence in the solution of an excess of an oxidizing agent over that required to oxidize the other metals, which excess is normally revealed by a rapid rise of the oxidation potential of the slurry. The excess of oxidizing agent is maintained until nearly all of the gold has been dissolved. During the dissolving of the gold, the preferred temperature is about 70° C. and the acidity of the slurry is maintained above 1 Normal. The measurement of the oxidation potentials of the ore slurry in the course of the operation of oxidizing and dissolving the ore enables one, as mentioned above, to follow and regulate the progress of oxidation of the metals and compounds dissolved during the attack of the ore by the acid and oxidizing agent. The control of the potential is maintained during the whole course of the operations so as to avoid reprecipitation of gold by the action of reducing materials which might be introduced accidentally or with the neutralizing agents.

In order to solubilize gold and the other metals according to the present invention, one may use chlorine itself or a material which generates chlorine in situ, for example, alkali or alkaline earth chlorates or hypochlorites. In some acidic media such as the sulphonitric medium it is possible to use oxidizing agents such as NaCl or HCl. In the first instance, the chlorine initially oxidizes any reducing products present in the ore, such as arsenides, sulphides and ferrous salts, and thereafter oxidizes the gold.

Applicants' invention may be carried out in the following manner, reference being made to the accompanying Figures 1 and 3:

The ore may be an arsenide or sulpharsenide ore containing principally cobalt, nickel, arsenic, iron and gold. An amount of sulphuric or hydrochloric acid based on the weight and the composition of the ore to be treated is introduced into a reactor 2 provided with a stirrer 3. The amount of acid should be sufficient to dissolve all of the metals in the ore and to insure a required excess acidity at the end of the oxidation of the ore. Ore ground to pass through a sieve having 200 meshes per lineal inch is then added to the acid in the reactor to form a slurry and the slurry is stirred. The cobalt and nickel dissolve first. The oxidation potential of the slurry at the end of this first step of the operation is represented by point A on the curve of Figure 1. An oxidizing agent is then added to the slurry. This agent may be, for example, an aqueous solution of sodium chlorate, calcium or sodium hypochlorite solution or chlorine. This agent oxidizes the reduced products and solubilizes them. As the oxidizing agent is gradually added to the slurry, the oxidation potential of the slurry gradually rises from point A to point C. Part A—B of the curve corresponds to the complete oxidation of iron and to the oxidation of the arsenic partly into arsenious acid and partly into arsenic acid. Thus, when point B has been reached, substantially all of the iron has been oxidized and dissolved but a part of the arsenic remains incompletely oxidized. The part B—C of the curve corresponds to the complete oxidation of the arsenic. It will be noted that there is a gradual rise in the slope of the curve from the point A to the point C. However, when all of the iron and all of the arsenic have been completely oxidized (point C of curve), the oxidation potential of the slurry rapidly rises from the point C to the point D showing that there is an excess of oxidizing agent over that required to oxidize all of the metals and compounds in the ore except gold. When the point D has been reached, the oxidation potential is such that gold dissolves very rapidly. The curve shown in Figure 1 is reproducible under the same conditions of operation as described above but under other conditions of operation, the form of the curve may change somewhat. However, it is not the absolute oxidation potential values which are of dominant importance but rather the rapid rise in oxidation potential shown by the part C—D of the curve as compared with the gradual rise in oxidation potential as shown by part A—C of the curve which is of dominant importance. When the point D has been reached, the necessary oxidation potential is maintained, for the time required for the nearly complete dissolution of gold, by the addition of small amounts of oxidizing agent. If the oxidation potential is allowed to drop, there is danger of the gold reprecipitating. When all of the metals, gold included, have been dissolved (point E of the curve), the acidity of the slurry, which at that time is about 1 to 2 Normal, is lowered by the addition of lime, calcium carbonate or other alkaline material. If the alkaline material used for lowering the acidity of the solution contains reducing materials (coke, organic materials), the reducing materials are likely to lower the oxidation potential of the slurry and cause the precipitation of gold. In order to avoid this, a small amount of oxidizing agent is added to the slurry during the neutralization (lowering of the acidity) of the solution if this is necessary. During the neutralization of the slurry, the oxidation potential should not be allowed to fall below about 600 millivolts or else there is the danger of reprecipitating gold from the solution. The pH value of the slurry is controlled during neutralization to keep it at a value not exceeding about 3.

The measurement of the oxidation potential of the slurry and the measurement of the pH should be made in a continuous manner by taking off constantly, by means of a pump or other device, not shown, samples of the slurry which are transferred to a measurement cell 4 in which the corresponding chain or chains of electrodes are immersed. These electrodes are connected with a registering device 5 which may be adjusted for different temperatures. When the neutralization of the slurry is ended (point F of the curve), the slurry is filtered in a filter 6 to separate the precipitate essentially composed of ferric arsenate and the undissolved residue from the solution (which contains some cobalt, nickel and gold) and the precipitate is washed. Preferably, a small amount of oxidizing agent is added to the first wash water in order to improve the yield of gold extraction.

The gold contained in the filtrate from the filter 6 may be separated from the cobalt and nickel by various known methods, such as the addition of sodium sulphide or iron powder, but, preferably, the gold is separated by continuously passing the solution through devices 7 containing one or more layers of activated carbon. If two reversible apparatuses 7 are employed in series, the gold concentration on the activated carbon may reach 20%. The concentrates of gold and activated carbon may be sold just as they are or they may be treated by various known methods to obtain fine gold, such as mechanical separation, electrolysis or calcination followed by lead coating and cupellation.

If the ore treated contained any silver, it will be dissolved along with the gold and, after the gold has been separated from the solution, the silver may be separated by passing the solution through a bed of fine shot metal which is more electro-negative than silver, for example, copper or iron.

Figure 2 illustrates the oxidation potential curve when sulphuric and nitric acids are used to dissolve the ore. The curve is slightly different than the one shown in Figure 1 where sulphuric or hydrochloric acids are used to dissolve the ore.

The basic process of using a sulphonitric medium to dissolve the ore is described in application No. 579,176, filed April 19, 1956 wherein the arsenide and/or sulpharsenide ores or materials, particularly of cobalt and/or nickel, are suspended in sulphuric acid to form a slurry. Nitric acid is then progressively added to slowly raise the oxidation potential to a value sufficient to convert the arsenic present in the ore into arsenious oxide. This phase of the process is shown between points A and B on Figure 2 and requires about two and one-half hours to complete. The arsenious oxide is then crystallized out of the solution by cooling, as illustrated by the break in the curve of Figure 2 between points B and C. If the initial ore does not contain an amount of arsenic greater than the quantity necessary to maintain a 1:1 ponderal ratio with the iron present in the ore, it is not necessary to remove the excess arsenic in the form of arsenious oxide.

The arsenious oxide and any undissolved residue of the ore are removed from the solution. The residue is separated from the arsenious oxide and the residue is then resuspended in the acidic filtrate obtained from the crystallization and filtration step. This procedure is described in application No. 579,176, filed April 19, 1956. As shown in Figure 2 at point C, the resuspension has an oxidation potential of a value about equal to that which it had prior to the removal of the arsenious oxide. The oxidation potential is maintained at a level of about 700 millivolts for about one hour. Normally this acidic filtrate has a sufficiently high oxidation potential to dissolve any of the remaining arsenides in the ore. However, additions of nitric acid can be made, if necessary, to raise the oxidation potential to achieve the desired dissolution. It is essential that the oxidation potential be continuously measured to maintain the oxidation potential at the desired value to dissolve the arsenides. An oxidizing agent is then introduced into the slurry (point D of Figure 2). If the oxidizing agent is gaseous chlorine or chlorate or hypochlorite, it completely oxidizes any of the remaining iron and oxidizes any remaining arsenious acid into arsenic acid. The oxidation potential then corresponds to point E of Figure 2. The oxidation potential then suddenly rises from point E to point F in Figure 2, to a value of about 1,000 millivolts. The oxidation potential is maintained at this value for a time sufficient to dissolve the gold contained in the initial ore. Then the acidity of the slurry is lowered by the addition of lime, calcium carbonate or other alkaline materials in the same manner as described above with reference to Figure 1. Precipitated ferric arsenate and the undissolved residue is filtered from the solution, the gold is removed, and the solution is further processed as described above with reference to the process of Figure 1.

NaCl or HCl may be added as oxidizing agents at point D in the sulphonitric acid attack instead of chlorine. The addition of NaCl or HCl will slowly raise the oxidation potential up to a value of about 800 millivolts. The oxidation potential is measured and controlled by use of a chain of platinum-saturated calomel electrodes in the same manner as described above. The oxidation curve produced by the addition of sodium chloride or hypochloric acid is different from that shown in Figure 2 in that there is no sudden break in the curve as shown between points E and F of Figure 2. The use of NaCl or HCl as oxidizing agents in the sulphonitric medium results in a solution containing all the gold in the dissolved state without all of the arsenious acid being totally oxidized. The arsenious acid has a low speed of oxidation in this medium which accounts for the fact that the gold is solubilized before the arsenious acid is completely oxidized. As soon as the gold is solubilized, the acidity of the solution is lowered by the addition of alkaline materials in the same manner as described above and the gold is removed in any desirable manner. However, care must be taken to rapidly remove the gold from the solution to avoid its slow reprecipitation caused by the remaining arsenious acid.

*Example 1*

4,000 kgs. of roasted speiss containing 39% cobalt, 4% nickel, 15% arsenic, 15% iron and 40 grams of gold per 1,000 kilograms of speiss were treated with 8,500 kgs. of 22° Bé. hydrochloric acid at a temperature of 90° C. to form a slurry in a reactor 2 having a useful capacity of 14 cubic meters. The reactor was lined with an anti-acid brickwork.

After one hour, the residual acidity had fallen to 0.8 N. At that moment, practically all of the cobalt and nickel had dissolved. Sodium chlorate solution of about 30% concentration was then added at the rate of about 200 kgs. of chlorate per hour. After two and one-half hours from the start of the operation, all of the iron and arsenic were oxidized and the oxidation potential of the slurry is represented by point C on the curve. The oxidation potential of the slurry rose gradually during this period. Toward the end of this operation, the rate of addition of sodium chlorate was reduced in order to avoid any wasteful excess of the chlorate and the temperature was allowed to drop to about 70° C. The oxidation potential then rose rapidly from 750 to 1,000 millivolts (point D) and it was maintained there for two hours by adding the sodium chlorate solution at the rate of 3 liters per hour. At that moment, the acidity of the slurry was 2 N and its volume was about 10 cubic meters. The slurry was then diluted with about 3 cubic meters of wash water of the residue of attack coming from a former operation. The acidity of the diluted slurry was then lowered by adding a 30% solution of calcium carbonate at the rate of 5 liters per hour until the end of the neutralization. The oxidation potential of the slurry was kept above 600 millivolts by this slow neutralization and the pH was controlled to keep it at a value not exceeding about 3. After neutralization, the slurry was filtered in filter 6 at a temperature of about 60° C. The residue remaining on the filter, composed of precipitated arsenate of iron and insoluble substances, was washed with a slightly chlorinated aqueous solution. The filtrate, mixed with the first wash water, was passed through two layers of activated charcoal arranged in series in the devices 7.

The residue retained on filter 6 weighed 2,800 kgs. and contained 0.40% cobalt. This cobalt, retained in the residue, was composed of cobalt which had not dissolved during the acid attack and cobalt adsorbed by iron arsenate. The amount adsorbed by the iron arsenate was about 0.1 to 0.2%. 99.3% of the cobalt in the ore was solubilized. The average content of gold in the residue retained on the filter 6 was 2 grams per metric ton. 96.5% of the gold was solubilized. The gold retained on the activated carbon in the devices 7 amounted to 90% of the gold contained in the ore.

*Example 2*

500 grams of raw smaltine, finely crushed to pass through a 200 screen, were suspended in sulphuric acid. Nitric acid was slowly added to maintain the oxidation potential along the curve between points A and B of Figure 2. The slurry was then cooled, which resulted in the crystallization of the arsenious acid. The cooled slurry was then filtered to remove the arsenious acid and any undissolved residue of the sulphonitric acid attack. The arsenious acid and residue were then redissolved and processed as described in application No. 579,176, filed April 19, 1956. The arsenious acid was thus separated from the residue. This residue was found to weigh 130 grams (in the dry state) and contained 1.10% cobalt. This residue was then resuspended in the acidic filtrate coming from the initial filtration and crystallization for removal of the arsenious acid. The suspension was heated to 95° C. and the oxidation potential was maintained at about 700 millivolts for about one hour, as shown between points C and D of Figure 2.

To determine the results of this one-hour acidic attack, the solution was filtered at point D. The dried residue weighed 110 grams and contained less than 0.16% cobalt but still contained the initial gold, i. e., 6.9 milligrams. All of the iron had been oxidized and solubilized but the arsenious acid had not as yet been oxidized to arsenic acid. The residue was then resuspended in the filtrate, the temperature was lowered to about 70° C., and chlorine was diffused into the suspension until all of the arsenious acid was oxidized (point E of Figure 2) and until there was an excess of chlorine (point F of Figure 2). The oxidation potential of about 1,020 millivolts was maintained for two hours. The acidity of the solution was then lowered by adding alkaline materials. The precipitated ferric arsenate and undissolved residue was then filtered from the solution. The dried residue weighed 100 grams and contained less than 0.165 milligram of gold.

Thus, 97.6% of the gold had been solubilized.

*Example 3*

This example relates to a sulphonitric attack of an arseniureted ore of cobalt and nickel followed by an oxidizing phase produced by the introduction of sodium chloride into the sulphonitric medium.

The curve representing the oxidation potential under these conditions is shown in Figure 4.

The dissolution and processing of the ore proceeded in the same manner as described in Example 2 up to point D. The curves in Figures 2 and 4 are substantially identical from points A to D. As stated above, the residue at point D contained a small amount of cobalt and all the initial gold. The iron contained in the solution was substantially all oxidized but there was still arsenious acid left. The temperature of the solution was lowered to 70° C. and 50 grams of sodium chloride were added. The oxidation potential followed a slow progressive rise for 2 hours to point E. At this time, a potential of 860 millivolts was observed. The solution was filtered and the residue was found to contain less than 0.190 mg. of gold. The solution still contained 9 grams of arsenious acid.

The invention is not limited to the preferred embodiment but might be otherwise embodied or practiced within the scope of the following claims.

We claim:

1. A process of extracting gold from arseniureted and sulpharseniureted ores, concentrates, residues and the like containing small amounts of gold and substantial amounts of iron and arsenic, which comprises forming a slurry of the ore in a mineral acid, adding an oxidizing agent to the slurry at a given rate to cause a gradual rise in the oxidation potential of the slurry to dissolve the metal except gold, continuously measuring the oxidation potential of the slurry during the addition of the oxidizing agent, progressively adding a chlorinating agent until an excess of the agent over that required to oxidize the gold has been added to the slurry, maintaining said excess of the oxidizing agent, as revealed by an increase in the oxidation potential, in the slurry by addition of the agent at a reduced rate until substantially all of the gold has been dissolved, precipitating iron and arsenic compounds by reducing the acidity of the slurry, separating the precipitate together with insoluble residue from the solution and recovering gold from the last mentioned solution.

2. A process according to claim 1, wherein the mineral acid is sulphuric acid.

3. A process according to claim 1, wherein the mineral acid is hydrochloric acid.

4. A process according to claim 1, wherein a chain of platinum-saturated calomel electrodes is used for measuring the oxidation potential of the slurry.

5. A process according to claim 1, wherein during dissolving of the gold the slurry is maintained at a temperature of about 70° C.

6. A process according to claim 1, wherein during dissolving of the gold the acidity of the slurry is between 1 and 2 Normal.

7. A process according to claim 1, wherein during dissolving of the gold the slurry is maintained at a temperature of about 70° C. and the acidity of the slurry is between 1 and 2 Normal.

8. A process according to claim 1, wherein during the lowering of the acidity of the slurry to precipitate iron and arsenic compounds, a chlorinating agent is added to prevent precipitation of gold.

9. A process according to claim 1, wherein in the lowering of the acidity of the slurry to precipitate iron and arsenic compounds, the pH is controlled to keep it at a value not exceeding about 3.

10. A process according to claim 1, wherein during the dissolving of the gold in the slurry, the oxidation potential, resulting from the addition of an excess of chlorinating agent, is maintained above 800 millivolts as measured by a chain of platinum-saturated calomel electrodes.

11. A process according to claim 1, wherein the oxidizing agent is from the group consisting of nitric acid, chlorine, hypochlorite and chlorate.

12. A process according to claim 1, wherein the said excess of the agent is revealed by a rapid rise in the oxidation potential of the slurry.

13. A process according to claim 1, wherein during the dissolving of the gold in the slurry, the oxidation potential, as measured by a chain of platinum-saturated calomel electrodes, is maintained above 800 millivolts and the temperature of the slurry is maintained at about 70° C.

14. A process according to claim 1, wherein during the dissolving of the gold in the slurry, the oxidation potential, as measured by a chain of platinum-saturated calomel electrodes, is maintained above 800 millivolts and the acidity of the slurry is maintained between 1 and 2 Normal.

15. A process according to claim 1, wherein during the dissolving of the gold in the slurry, the oxidation potential, as measured by a chain of platinum-saturated calomel electrodes, is maintained above 800 millivolts, the temperature of the slurry is maintained at about 70° C. and the acidity of the slurry is maintained between 1 and 2 Normal.

16. A process of extracting gold from unsmelted raw ores, concentrates, residues and the like containing cobalt, iron, arsenic and gold, which comprises forming a slurry of the ore in a mineral acid, maintaining the oxidation potential of the slurry at a value and for a time sufficient to oxidize a substantial part of the metals, adding an oxidizing agent to the slurry to cause a gradual rise in the oxidation potential of the slurry to a value over that required to oxidize all of the metals, including gold, maintaining said excess of the oxidizing agent until all of the gold has been dissolved, lowering the acidity of the slurry to precipitate iron and arsenic compounds, separating the precipitate together with insoluble residue from the solution and recovering gold from the last mentioned solution.

17. A process according to claim 1, wherein the excess of chlorinating agent necessary for the complete dissolution of the gold results in the oxidation potential being maintained continuously above 800 millivolts, as measured by a chain of platinum-saturated calomel electrodes.

References Cited in the file of this patent

UNITED STATES PATENTS 541,657    Crooke _____ June 25, 1895

OTHER REFERENCES

"The Oxidation States of the Elements and Their Potentials in Aqueous Solutions" (Latimer), pub. by Prentice-Hall, Inc. New York, 1938. Pages 2 and 3 relied on.

UNITED STATES PATENT OFFICE

CERTIFICATE OF CORRECTION

Patent No. 2,835,569                      May 20, 1958

Francis Reynaud et al.

It is hereby certified that error appears in the above numbered patent requiring correction and that the said Letters Patent should read as corrected below.

In the heading to the printed specification, between lines 11 and 12, insert the following:

--- Claims priority, application France April 20, 1955 ---.

Signed and sealed this 5th day of August 1958.

(SEAL)
Attest:

KARL H. AXLINE                      ROBERT C. WATSON
Attesting Officer                 Commissioner of Patents